United States Patent
Bae et al.

(10) Patent No.: US 12,548,854 B2
(45) Date of Patent: Feb. 10, 2026

(54) LITHIUM SECONDARY BATTERY INCLUDING SI-BASED ANODE ACTIVE MATERIAL

(71) Applicant: LG ENERGY SOLUTION, LTD., Seoul (KR)

(72) Inventors: Kyeong Hui Bae, Daejeon (KR); So Yeong Lee, Daejeon (KR); So Mi Jeong, Daejeon (KR); Won Sik Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 27 days.

(21) Appl. No.: 18/690,992

(22) PCT Filed: Mar. 31, 2023

(86) PCT No.: PCT/KR2023/004414
§ 371 (c)(1),
(2) Date: Mar. 11, 2024

(87) PCT Pub. No.: WO2023/243833
PCT Pub. Date: Dec. 21, 2023

(65) Prior Publication Data
US 2024/0266679 A1    Aug. 8, 2024

(30) Foreign Application Priority Data

Jun. 14, 2022  (KR) .......... 10-2022-0072073
Mar. 28, 2023  (KR) .......... 10-2023-0040702

(51) Int. Cl.
*H01M 50/449*    (2021.01)
*H01M 4/36*       (2006.01)
(Continued)

(52) U.S. Cl.
CPC ......... *H01M 50/494* (2021.01); *H01M 4/364* (2013.01); *H01M 4/587* (2013.01);
(Continued)

(58) Field of Classification Search
CPC .... H01M 50/494; H01M 4/364; H01M 4/587; H01M 50/417; H01M 50/446;
(Continued)

(56) References Cited

U.S. PATENT DOCUMENTS

2008/0057389 A1    3/2008  Kono et al.
2009/0087749 A1    4/2009  Takita et al.
(Continued)

FOREIGN PATENT DOCUMENTS

CN    101511589 A    8/2009
CN    102131571 A    7/2011
(Continued)

OTHER PUBLICATIONS

Machine translation of WO 2020/195380, retrieved from <www.espacenet.com> on Dec. 19, 2024. (Year: 2024).*
(Continued)

*Primary Examiner* — Cynthia K Walls
(74) *Attorney, Agent, or Firm* — Morgan, Lewis & Bockius LLP (57) ABSTRACT

Provided is a lithium secondary battery with reduced Hi-pot defects and improved capacity retention rate. According to one aspect of the present disclosure, there is provided a lithium secondary battery including an anode, a cathode, and a separator interposed between the anode and the cathode, in which the anode includes a Si-based anode active material, the separator includes a separator substrate having a plurality of pores and including a polyolefin resin, the polyolefin
(Continued)

resin has a polydispersity index (PDI) of 2.5 to 4.2, an average pore size of 20 to 40 nm, and a maximum pore size of 50 nm or less.

20 Claims, 2 Drawing Sheets

(51) Int. Cl.
*H01M 4/587* (2010.01)
*H01M 50/417* (2021.01)
*H01M 50/446* (2021.01)
*H01M 50/457* (2021.01)
*H01M 50/494* (2021.01)

(52) U.S. Cl.
CPC ....... *H01M 50/417* (2021.01); *H01M 50/446* (2021.01); *H01M 50/457* (2021.01)

(58) Field of Classification Search
CPC ............... H01M 50/457; H01M 4/134; H01M 10/0525; H01M 2004/027; H01M 4/36; H01M 4/38; H01M 4/386; H01M 4/48; H01M 4/483; H01M 10/052; H01M 50/449; H01M 50/451; H01M 50/489; H01M 50/491; H01M 4/02; Y02E 60/10
See application file for complete search history.

(56) References Cited

U.S. PATENT DOCUMENTS

| | | | |
|---|---|---|---|
| 2009/0111026 A1* | 4/2009 | Kim .................. | H01M 50/446 429/252 |
| 2009/0123822 A1 | 5/2009 | Takita et al. | |
| 2011/0159343 A1 | 6/2011 | Yamada | |
| 2012/0015229 A1 | 1/2012 | Ohasji et al. | |
| 2012/0258350 A1* | 10/2012 | Fukui .................. | H01M 50/491 525/61 |
| 2013/0209892 A1 | 8/2013 | Ogawa et al. | |
| 2014/0315067 A1 | 10/2014 | Yamada | |
| 2018/0076479 A1 | 3/2018 | Kawasaki et al. | |
| 2018/0159131 A1* | 6/2018 | Seol ........................ | H01M 4/13 |
| 2019/0157647 A1 | 5/2019 | Kidosaki et al. | |
| 2020/0024419 A1 | 1/2020 | Yamashita et al. | |
| 2021/0005861 A1* | 1/2021 | Hong .................. | H01M 50/446 |
| 2021/0074983 A1 | 3/2021 | Zhang et al. | |
| 2021/0214535 A1 | 7/2021 | Yamashita et al. | |
| 2023/0268615 A1 | 8/2023 | Park et al. | |

FOREIGN PATENT DOCUMENTS

| | | | | |
|---|---|---|---|---|
| CN | 103184013 A | | 7/2013 | |
| CN | 108473706 A | | 8/2018 | |
| CN | 111727517 A | | 9/2020 | |
| CN | 111902470 A | | 11/2020 | |
| CN | 113614993 A | | 11/2021 | |
| EP | 2 004 740 A1 | | 12/2008 | |
| EP | 2 111 912 A1 | | 10/2009 | |
| EP | 2 111 913 A1 | | 10/2009 | |
| EP | 3832770 | * | 7/2020 | .......... H01M 10/052 |
| EP | 3832770 A1 | | 6/2021 | |
| JP | 11-123799 A | | 5/1999 | |
| JP | 2012-501357 A | | 1/2012 | |
| KR | 10-1994-0015012 A1 | | 7/1994 | |
| KR | 10-2010-0053685 A | | 5/2010 | |
| KR | 10-2011-0114720 A | | 10/2011 | |
| KR | 10-2013-0108256 A | | 10/2013 | |
| KR | 10-2018-0113517 A | | 10/2018 | |
| KR | 10-2019-0118640 A | | 10/2019 | |
| KR | 10-2020-0106880 A | | 9/2020 | |
| KR | 10-2022-0032502 A | | 3/2022 | |
| WO | 2016/152876 A1 | | 9/2016 | |
| WO | WO 2020/195380 | * | 10/2020 | .......... H01M 50/409 |
| WO | 2022/050801 A1 | | 3/2022 | |

OTHER PUBLICATIONS

Evidence of acrylic as amorphous carbon, <https://advanced-emc.com/amorphous-vs-semi-crystalline-polymers/#:~:text=Amorphous%20thermoplastics%20include%20acrylic%2C%20polycarbonate,temperatures%20over%20which%20they%20melt.>, retrieved Apr. 1, 2025 (Year: 2025).*

Office Action issued in corresponding Chinese Patent Application No. 202380013726.6, dated Sep. 15, 2024.

International Search Report (with partial translation) and Written Opinion issued in corresponding International Patent Application No. PCT/KR2023/004414, dated Jul. 10, 2023.

\* cited by examiner

LITHIUM SECONDARY BATTERY INCLUDING SI-BASED ANODE ACTIVE MATERIAL

CROSS-REFERENCE TO RELATED APPLICATION

This application is the National Stage filing under 35 U.S.C. § 371 of International Application No. PCT/KR2023/004414, filed on Mar. 31, 2023, and claims priority to Korean Patent Application No. 10-2022-0072073, filed on Jun. 14, 2022, and Korean Patent Application No. 10-2023-0040702 filed on Mar. 28, 2023.

TECHNICAL FIELD

The present disclosure claims the benefit of the filing date of Korean Patent Application No. 10-2022-0072073 filed with the Korean Patent Office on Jun. 14, 2022, the entire contents of which are incorporated herein by reference.

The present disclosure relates to a lithium secondary battery including a Si-based anode active material as an anode active material.

BACKGROUND ART

As a separator for a lithium secondary battery, a film based on a polymer resin such as polyolefin and having a plurality of pores is used. Typically, an electrode assembly is manufactured through a lamination process in which a separator and an electrode are bonded by application of heat and pressure. The higher the heat and pressure applied to the separator, the higher the bonding force between the electrode and the separator. Recently, for the purpose of improving productivity, adhesion is secured by increasing application pressure because time of heat application to the separator is shortened as the process speeds up. However, the increase of application pressure may cause the electrode assembly to be deformed. During the lamination process, the thickness of the polymer film substrate is significantly reduced and the damage to the pores increases, resulting in a decrease in the performance of a battery as well as a decrease in the dielectric breakdown voltage of the separator, resulting in increased Hi-pot defects and reduced capacity retention rates (CRR).

Particularly, when a Si-based anode active material such as Si, SiO, or Si alloy is used as an anode active material of a lithium secondary battery, the volume expansion of the anode is large, and thus the internal pressure of cells increases, resulting in intensified compression deformation of the separator. In addition, the Si-based anode active materials have a greater granularity, roughness, and hardness than graphite anode active materials, thereby causing local damage to the separator while the lamination membrane of the anode active material and the separator.

Therefore, when an Si-based anode active material is used, it is necessary to develop a separator having improved compression resistance.

DISCLOSURE

Technical Problem

An objective of the present disclosure is to provide a lithium secondary battery including a Si-based anode active material, the lithium secondary battery having reduced Hi-pot defects and an improved capacity retention rate.

It will be readily apparent that the objectives and advantages of the present disclosure can be achieved by means or methods and combinations thereof recited in the claims.

Technical Solution

According to a first aspect of the present disclosure, there is provided a lithium secondary battery including an anode, a cathode, and a separator interposed between the anode and the cathode, in which the anode includes a Si-based anode active material, the separator includes a separator substrate having a plurality of pores and including a polyolefin resin, the polyolefin resin has a polydispersity index (PDI) of 2.5 to 4.2, an average pore size of 20 to 40 nm, and a maximum pore size of 50 nm or less.

According to a second aspect of the present disclosure, there is provided a lithium secondary battery including an anode, a cathode, and a separator interposed between the anode and the cathode, in which the anode includes a Si-based anode active material,
the separator includes a separator substrate having a plurality of pores and including a polyolefin resin,
the polyolefin resin has a polydispersity index (PDI) of 2.5 to 4.2,
the pores have an average pore size of 20 to 40 nm and a maximum pore size of 50 nm or less, and
the separator has characteristics in which
a strain thereof is 25% or less when a tensile stress of 15 MPa is applied thereto at 60° C. for 60 seconds and
it takes 200 seconds or less until reaching a recovery rate of 70% after a tensile stress of 2 MPa is applied at 70° C. for 180 seconds and then removed.

According to a third aspect of the present disclosure, there is provided a lithium secondary battery,
in the first or second aspect,
the polyolefin resin has a polydispersity index (PDI) of 2.5 to 4.0,
the pores have an average pore size of 20 to 39 nm and a maximum pore size of 48 nm or less, and
the separator has characteristics in which
a strain thereof is 23% or less when a tensile stress of 15 MPa is applied thereto at 60° C. for 60 seconds and
it takes 190 seconds or less until reaching a recovery rate of 70% after a tensile stress of 2 MPa is applied at 70° C. for 180 seconds and then removed.

A fourth aspect of the present disclosure provides a lithium secondary battery,
in the third aspect,
the polyolefin resin has a polydispersity index (PDI) of 2.6 to 3.9,
the pores have an average pore size of 21 to 38 nm and a maximum pore size of 46 nm or less, and
the separator has characteristics in which
a strain thereof is 21% or less when a tensile stress of 15 MPa is applied thereto at 60° C. for 60 seconds and
it takes 180 seconds or less until reaching a recovery rate of 70% after a tensile stress of 2 MPa is applied at 70° C. for 180 seconds and then removed.

A fifth aspect of the present disclosure provides a lithium secondary battery,
in the fourth aspect,
the pores have an average pore size of 22.2 to 36.1 nm,
the separator has characteristics in which
a strain thereof is 20.1% or less when a tensile stress of 15 MPa is applied thereto at 60° C. for 60 seconds and it takes 178 seconds or less until reaching a recovery rate of 70% when a tensile stress of 2 MPa is applied at 70° C. for 180 seconds and then removed.

A sixth aspect of the present disclosure provides a lithium secondary battery,
in any one of the first to fifth aspects, the polyolefin resin has a weight average molecular weight of 500,000 to 1,500,000 g/mol.

A seventh aspect of the present disclosure provides a lithium secondary battery,
in any one of the first to sixth aspects, the separator substrate includes a core portion made of a mixture of polyethylene and polypropylene and a polyethylene skin portion provided on each of both surfaces of the core portion.

An eighth aspect of the present disclosure provides a lithium secondary battery,
in any one of the first to seventh aspects, the separator substrate is a separator substrate manufactured by a wet manufacturing method in which pores are formed by extracting a pore forming agent.

A ninth aspect of the present disclosure provides a lithium secondary battery,
in any one of the first to eighth aspects, the Si-based anode active material includes at least one kind selected from the group consisting of Si, SiO, and Si alloys.

A tenth aspect of the present disclosure provides a lithium secondary battery,
in any one of the first to ninth aspects, the anode is an anode active material further including graphite.

According to an eleventh aspect of the present disclosure, in any one of the first to tenth aspects,
the separator further includes an organic/inorganic composite coating layer disposed on at least one surface of the separator substrate, in which the organic/inorganic composite coating layer includes a crystalline binder and an amorphous binder.

According to a twelfth aspect of the present disclosure, in the eleventh aspect,
the lithium secondary battery further includes an electrolyte, and the crystalline binder and the amorphous binder each independently have a concentration gradient in a thickness direction of the organic/inorganic composite coating layer.

According to a thirteenth aspect of the present disclosure, in the twelfth aspect,
the organic/inorganic composite coating layer may include a first portion adjacent to the separator substrate and a second portion opposite to the first portion, and the concentration of the crystalline binder in the second portion is higher than the concentration of the crystalline binder in the first portion.

Advantageous Effects

The polyolefin separator provided in the lithium secondary battery according to the present disclosure has a polyolefin resin polydispersity index (PDI), an average pore size, and a maximum pore size which are controlled to fall within predetermined ranges, and the separator has a strain and recovery rate that are controlled not to be higher than predetermined values. Therefore, the separator has improved compression resistance.

Therefore, the thickness reduction rate of the separator or the damage to the separator due to the pressure applied during the lamination process for manufacturing an electrode assembly with a Si-based anode having a high volume expansion rate and a high hardness index is low. Therefore, the Hi-pot defects are reduced, and the capacity retention rate is improved. In addition, the process speed can be increased, resulting in improvement in processability.

DESCRIPTION OF DRAWINGS

The accompanying drawings illustrate preferred embodiments of the present disclosure, and illustrate the principles of the present disclosure in conjunction with a detailed description given below, but the scope of the present disclosure is not limited thereto. On the other hand, the shapes, sizes, scales, or proportions of elements illustrated in the accompanying drawings may be exaggerated to emphasize further clarity.

BEST MODE

Figure 1:
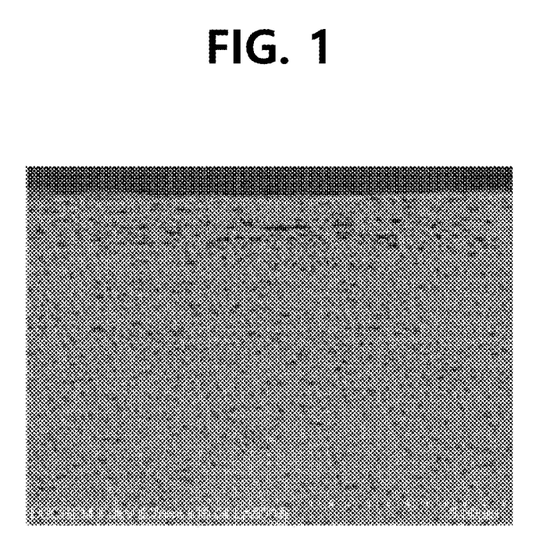
FIG. 1 is an SEM image of a cross section of a separator of Example 1.
Figure 2:
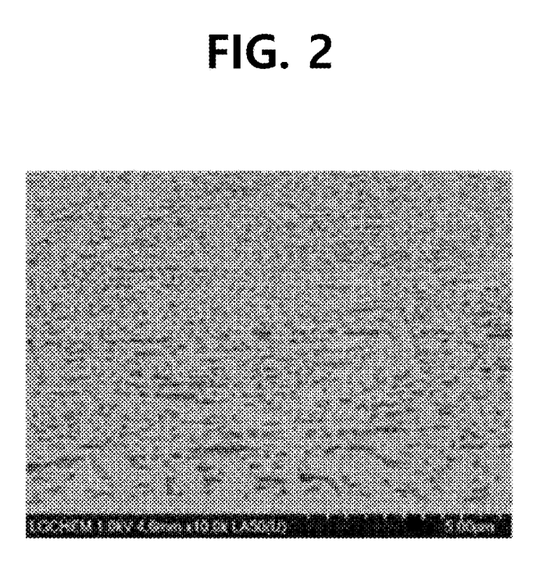
FIG. 2 is an SEM image of a cross section of a separator of Comparative Example 1.
Figure 3:
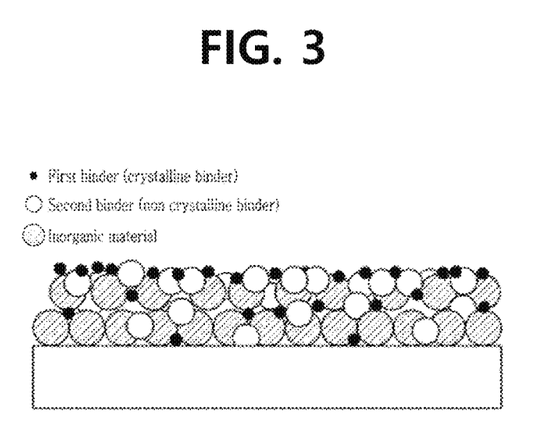
FIG. 3 is a distribution of a crystalline binder, an amorphous binder, and inorganic particles in a cross section of a separator injected with an electrolyte, according to one embodiment of the present disclosure.

Hereinafter, the present disclosure will be described. Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its invention in the best way possible. The exemplary embodiments described herein and the configurations illustrated in the drawings are presented for illustrative purposes and do not exhaustively represent the technical spirit of the present disclosure. Accordingly, it should be appreciated that there will be various equivalents and modifications that can replace the exemplary embodiments and the configurations at the time at which the present application is filed.

It will be further understood that the terms "comprise", "include", or "has", when used in this specification, specify the presence of an element, but do not preclude the presence or addition of one or more other elements unless the context clearly indicates otherwise.

In the present specification, the separator has a porous property having multiple pores, and the separator serves as a porous ion-conducting barrier that prevents an anode and a cathode from being electrically connected and allows transmission of ions, in a lithium secondary battery. The characteristic "having pores" herein means that a gas-phase and/or liquid-phase fluid is passable from one side to the other side of an object through pores formed in the object and through a structure connecting the pores.

In the present disclosure, a polyolefin separator can be interpreted as a separator itself or a component of a separator. Accordingly, the polyolefin separator described in the present disclosure may further include an additional layer on at least one surface of a separator substrate if necessary in terms of material or function. According to one embodiment of the present disclosure, the separator may have an organic/inorganic composite coating layer including inorganic particles and/or binder resin on at least one side or both sides of the porous substrate.

In the present disclosure, a lithium secondary battery uses lithium ions as an ion conductor. Examples of the lithium secondary battery include, but are not limited to, a non-aqueous electrolyte secondary battery including a liquid electrolyte, an all-solid-state battery including a solid electrolyte, a lithium polymer battery including a gel-type polymer electrolyte, and a lithium metal battery using a lithium metal as an anode.

Hereinafter, a lithium secondary battery according to one embodiment of the present disclosure will be described in detail.

A lithium secondary battery according to the present disclosure includes an anode, a cathode, and a separator interposed between the anode and the cathode, in which the anode includes a Si-based anode active material,
the separator includes a separator substrate having a plurality of pores and including a polyolefin resin,
the polyolefin resin has a polydispersity index (PDI) of 2.5 to 4.2,
the pores have an average pore size of 20 to 40 nm and a maximum pore size of 50 nm or less, and
the separator has characteristics in which
a strain thereof is 25% or less when a tensile stress of 15 MPa is applied thereto at 60° C. for 60 seconds and
it takes 200 seconds until reaching a recovery rate of 70% after a tensile stress of 2 MPa is applied at 70° C. for 180 seconds and then removed.
may provide a lithium secondary battery In the present disclosure, the anode includes a Si-based anode active material. The Si-based anode active material may be a material including at least one kind of material selected from the group consisting of Si, SiO, and Si alloys but may not be limited thereto. In addition to the Si-based anode active material, the anode may further include 10% to 90% by weight of another anode active material such as graphite, with respect to the total weight of the anode active materials.

Si-based negative active materials such as Si, SiO, and Si alloys are anode active materials that are being researched and developed in consideration of capacity. When such a material is used as an anode active material of a lithium secondary battery, since the volume expansion of the anode is large, the internal pressure of cells increases, resulting in intensified compression deformation of the separator. In addition, the Si-based anode active materials have a greater granularity, roughness, and hardness than graphite anode active materials, thereby causing local damage to the separator when being laminated with the separator.

To solve the problems caused by the use of a Si-based anode active material, the present disclosure applies a compression-resistant polyolefin-based separator having the characteristics described above.

The polyolefin separator according to the present disclosure is made using a polyolefin resin as a base resin. Examples of the polyolefin-based resin include, but are not limited to, polyethylene, polypropylene, polypentene, and the like. The porous separator, i.e., separator having multiple pores, made of such a polyolefin resin as a base resin is advantageous in terms of inparting a shutdown function at appropriate temperatures. Particularly, when polyethylene and polypropylene are both included as the polyolefin resin, both the shutdown characteristic and physical properties such as mechanical strength can be improved.

In general, the higher the molecular weight of the resin, the more advantageous in terms of compression resistance. Therefore, the polyolefin resin may have a weight average molecular weight of 500,000 to 1,500,000 g/mol. When different kinds of polyolefin resins are used in a mixed form or a multi-layered separator made of different kinds of polyolefin resins is formed, the weight average molecular weight of the polyolefin resin is calculated by adding the weight average molecular weights while applying the content ratio of each polyolefin resin.

In addition to the polyolefin base resin described above, other resin components may be further mixed as needed. Aside from the resin components, for example, filler particles may be included. The filler particles may be included to serve as a pressure barrier so that the thickness, pore size, and porosity of the separator substrate are not excessively reduced by a high pressure applied in the lamination process described below. The filler particles may include organic filler particles or inorganic filler particles having a predetermined particle size. The composition of the filler particles is not limited if it exhibits a strength equal to or larger than the strength of the polyolefin resin.

In the present disclosure, the polydispersity index (PDI) of the polyolefin resin is 2.5 to 4.2, the average pore size of the pores is 20 to 40 nm, and the maximum pore size of the pores is 50 nm or less. That is, in the present disclosure, the polydispersity index of the polyolefin resin is low, and the average pore size and the maximum pore size are small. Compression resistance is improved when these ranges are satisfied at the same time. When the polydispersity index is less than 2.5, there is a problem that the processability decreases and the film uniformity decreases. On the other hand, when the polydispersity index exceeds 4.2, there is a problem that the compression resistance decreases. In addition, when the average pore size of the pores is smaller than 20 nm, the air permeability decreases, and the small pores are clogged with the by-products produced during battery charging and discharging. When the average pore size exceeds 40 nm, the thickness of the separator is not uniform, thickness change occurs, and the compression resistance of the separator decreases due to local thickness changes. In addition, when the maximum pore size of the pores exceeds 50 nm, there is a problem that the compression resistance decreases.

The size of the pores may be calculated from the pore size distribution measured using a capillary flow porometer. For example, first, the separator to be measured is wetted with a wetting agent such as a Galwick solution, and then the air pressure on one side of the substrate is gradually increased. At this time, when the applied air pressure is greater than the capillary attraction of the wetting agent being present in the pores, the wetting agent in the pores is pushed out. The pore sizes and distribution are measured from the air pressure and flow rate at the moment at which the wetting agent is pushed out of the pores. In this way, the average pore size and the maximum pore size can be determined.

In this aspect, the polydispersity index (PDI) of the polyolefin resin may be in the range of from 2.5 to 4.0 and more specifically the range of from 2.6 to 3.9. In addition, the average pore size of the pores may be in the range of from 20 to 39 nm, more specifically the range of from 21 to 38 nm, and most specifically the range of from 22.2 to 36.1 nm. In addition, the maximum pore size of the pores may be 48 nm or less and more specifically 46 nm or less.

On the other hand, in the present disclosure, the separator substrate has a strain of 25% or less when a tensile stress of 15 MPa is applied at 60° C. for 60 seconds and a recovery time of 200 seconds or less until reaching a recovery rate of 70% when a tensile stress of 2 MPa is applied at 70° C. for 180 seconds and then removed.

When the strain in the above conditions exceeds 25% or the recovery time until reaching a recovery rate of 70% exceeds 200 seconds, the compression resistance of the separator is reduced after the separator is laminated with the Si-based anode.

In this aspect, the polyolefin separator substrate has characteristics in which the separator substrate has a strain of 23% or less when a tensile stress of 15 MPa is applied at 60° C. for 60 seconds and a recovery time of 190 seconds or less until reaching a recovery rate of 70% when a tensile stress of 2 MPa is applied at 70° C. for 180 seconds, more specifically, the separator substrate has a strain of 21% or less when a tensile stress of 15 MPa is applied at 60° C. for 60 seconds and a recovery time of 180 seconds or less until reaching a recovery rate of 70% when a tensile stress of 2 MPa is applied at 70° C. for 180 seconds, and most specifically, the separator substrate has a strain of 20.1% or less when a tensile stress of 15 MPa is applied at 60° C. for 60 seconds and a recovery time of 178 seconds or less until reaching a recovery rate of 70% when a tensile stress of 2 MPa is applied at 70° C. for 180 seconds.

The polyolefin separator substrate described above may be prepared by a method described below, but is not limited thereto.

In one embodiment of the present disclosure, the separator may be prepared by kneading a polyolefin resin with a diluent at a high temperature to form a single phase, performing phase separation into the polymer material and the diluent during a cooling process, and performing elongation and thermal fixing treatment (wet process). Particularly, the polyolefin separator may include a core portion made of a mixture of polyethylene and polypropylene and a polyethylene skin portion laminated on both sides of the core portion. However, the polyolefin separator is not limited thereto.

The average pore size and maximum pore size of the pores of the separator substrate can be easily controlled by adjusting the mixing ratio of the diluent, elongation magnification, and heat treatment temperature to fall within the ranges of the present disclosure.

In the present disclosure, the polyolefin separator substrate prepared by the method described above has a thickness of 5 μm to 30 μm.

In one embodiment of the present disclosure, the separator may further include an organic/inorganic composite coating layer formed on at least one surface of the polyolefin separator substrate.

The organic/inorganic composite coating layer includes a binder resin and inorganic particles and has porous properties. In one embodiment of the present disclosure, the binder resin and inorganic particles of the organic/inorganic composite coating layer may be included in a ratio of 1:99 to 30:70 by weight. The ratio may be appropriately adjusted within the range. For example, based on a sum of the binder resin and the inorganic particles 100% by weight, the binder resin may be 1% by weight or more, 5% by weight or more, or 10% by weight or more, and the inorganic particles may be 80% by weight or more, 85% by weight or more, 90% by weight or more, or 95% by weight or more.

The organic/inorganic composite coating layer may be formed such that the inorganic particles are bonded by the binder resin and integrated into the layer. The pores in the organic/inorganic composite coating layer are caused by an interstitial volume that is an empty space between the inorganic particles.

In one embodiment of the present disclosure, the porosity of the organic/inorganic composite coating layer and the porosity of the heat resistant layer may be 30% to 70% by volume. When the porosity is 70% by volume or less, the mechanical properties may be sufficient to withstand the conditions of the press process during bonding to the electrode. In addition, since the surface opening ratio is not excessively high, the porosity level is suitable for securing the adhesive strength. On the other hand, when the porosity is 30% by volume or more, it is advantageous in terms of ion permeability.

The thickness of the organic/inorganic composite coating layer may be in the range of from 1 μm to 20 μm on either side of the separator substrate. However, the thickness of the organic/inorganic composite coating layer is not particularly limited thereto. The thickness can be adjusted to fall within a suitable range by those skilled in the art, taking heat resistance or electrical resistance into account.

In the present disclosure, a non-limiting example of the binder resin usable for the organic/inorganic composite coating layer may be any one polymer resin or a mixture of two or more kinds selected from the group consisting of polyvinylidene fluoride-co-hexafluoropropylene, polyvinylidene fluoride-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethylsucrose, pullulan, and carboxyl methyl cellulose. However, it is not particularly limited to thereto.

In one specific embodiment of the present disclosure, the inorganic particles that can be used in the organic/inorganic composite coating layer are not particularly limited as long as they are electrochemically stable. That is, the inorganic particles used in the present disclosure are not particularly limited unless an oxidation and/or reduction reaction occurs within an operating voltage range (for example, 0 to 5 V for the case of $Li/Li^+$) of an electrochemical element.

Non-limiting examples of the inorganic particle include $BaTiO_3$, $Pb(Zr,Ti)O_3$(PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$(PMN-PT), hafnia ($HfO_2$), $SrTiO_3$, $SnO_2$, $CeO_2$, $MgO$, $Mg(OH)_2$, $NiO$, $CaO$, $ZnO$, $ZrO_2$, $SiO_2$, $Y_2O_3$, $Al_2O_3$, $SiC$, $Al(OH)_3$, $TiO_2$, aluminum peroxide, zinc tin hydroxide ($ZnSn(OH)_6$), tin-zinc oxide ($Zn_2SnO_4$, $ZnSnO_3$), antimony trioxide ($Sb_2O_3$), antimony tetraoxide ($Sb_2O_4$), antimony pentoxide ($Sb_2O_5$) and the like. Any one of these or a mixture of two or more kinds of these may be used.

In addition, the average diameter $D_{50}$ of the inorganic particles is not particularly limited but is preferably in the range of from 0.3 μm to 1 μm to form a uniform coating layer and to obtain a suitable porosity. When the thickness of the coating layer is smaller than 0.3 μm, the dispersibility of the inorganic particles in the slurry prepared for manufacturing the heat resistant layer may be reduced. When the thickness of the coating layer is larger than 1 μm, the thickness of the coating layer may be excessively large.

In one embodiment of the present disclosure, the organic/inorganic composite coating layer is prepared by a method described below. First, a polymer solution is prepared by dissolving a binder resin in an appropriate organic solvent. It is desirable that the solvent has a similar solubility index to the binder polymer to be used and a low boiling point. This is to facilitate uniform mixing and subsequent solvent removal. Non-limiting examples of the usable solvent include acetone, tetrahydrofuran, methylene chloride, chloroform, dimethylformamide, N-methyl-2-pyrrolidone (NMP), cyclohexane, water, or any mixture thereof.

Next, inorganic particles are added and dispersed in the prepared polymer solution. In the present disclosure, the content ratio of the inorganic particles and the binder is appropriately determined as described above, depending on the thickness of the heat resistant layer to be formed, the pore size, and porosity.

Next, the prepared slurry of the inorganic particles is applied to at least one surface of the prepared separator substrate and dried. The method of applying the slurry to the surface of the separator substrate is not particularly limited to any one method, and a conventional method known in the art can be used. For example, various methods such as dip coating, die coating, roll coating, comma coating, or a mixture thereof may be used.

For the drying process, temperature and time conditions are appropriately set to minimize the occurrence of surface defects of the organic/inorganic composite coating layer. The drying may be performed in appropriate conditions using a drying auxiliary device such as a drying oven or hot air.

When the separator includes the organic/inorganic composite porous layer, damage caused by the inorganic particles pressed against the surface of the separator substrate that faces the organic/inorganic composite porous layer during the lamination process can be reduced.

The crystallinity herein can be expressed as a percentage of the melting enthalpy value measured by differential scanning calorimetry (DSC) measurement with respect to the melting enthalpy value of theoretically perfect crystals (crystallinity 100%). The amorphous binder according to the present disclosure means that a binder having a crystallinity of 30% or less, and the crystalline binder means a binder having a crystallinity of more than 30%.

According to another embodiment of the present disclosure, the separator further includes an organic/inorganic composite coating layer disposed on at least one surface of the separator substrate, in which the organic/inorganic composite coating layer includes a crystalline binder and an amorphous binder. According to a further embodiment of the present disclosure, since the organic/inorganic composite coating layer includes a crystalline binder and an amorphous binder, when an electrolyte solution is present, the adhesion (wet adhesion) of the organic/inorganic composite coating layer to the electrode is secured by the crystalline binder. For example, when an electrolyte is not present, a crystalline binder and an amorphous binder may be randomly distributed on the surface of the separator substrate. When the electrode and the separator are bonded, an amorphous binder having a relatively low glass transition temperature Tg and a relatively large surface area may be deformed due to the temperature and pressure during the bonding and thus may be present on the surface in a larger amount, resulting in an increase in a dry adhesion force with the electrode. When the electrolyte is introduced, the amorphous binder having a high solubility to the electrolyte and high flowability may swell and may move into the organic/inorganic composite coating layer or into the electrode. For example, when an organic solvent is used, a polymer binder that is being amorphous can more expand than to a binder with high crystallinity. Due to the expansion of the polymer binder, flowability may occur and thus the polymer binder may move into the composite coating layer or the electrode. Since a crystalline binder is mainly present on the surface of the organic/inorganic composite coating layer, when an electrolyte is present, wet adhesion of the separator to the electrode may occurs due to the crystalline binder.

Specifically, the lithium secondary battery further includes an electrolyte, and the crystalline binder and the amorphous binder each independently have a concentration gradient in a thickness direction of the organic/inorganic composite coating layer. For example, the slurry may be applied to at least one surface of the separator substrate, and the separator substrate may then be transferred to a heating zone so that the slurry can be dried to form an organic/inorganic composite coating layer. The slurry-applied separator substrate may be dried while moving through the heating zone heated to a predetermined temperature at a predetermined speed to form a separator with an organic/inorganic composite coating layer. According to one example, the heating temperature of the heating zone may be in the range of from 45° C. to 65° C. The porous separator substrate may move through the heating zone at a speed of 25 to 150 m/min and specifically a speed of 40 to 60 m/min. The drying conditions of the organic/inorganic composite coating layer may be determined depending on morphological differences between the binder and the inorganic particles. The drying conditions may determine the concentration gradient of each of the binder and the inorganic particles distributed in the thickness direction of the coating layer.

According to a yet further embodiment of the present disclosure, the organic/inorganic composite coating layer may include a first portion adjacent to the separator substrate and a second portion opposite to the first portion. Specifically, the concentration of the crystalline binder in the second portion may be higher than the concentration of the crystalline binder in the first portion. The first portion adjacent to the separator substrate may be relatively close to the separator substrate with respect to a mid-surface of the organic/inorganic composite coating layer cut in a plane direction. Specifically, the first portion may be in contact with the separator substrate. For example, the second portion may be closer to the electrode than the first portion with respect to a mid-surface of the organic/inorganic composite coating layer cut in a plane direction. Specifically, the second portion may be in contact with the electrode. According to one example, the average thickness of the first portion may be in the range of from 0.1 to 10 μm, 0.1 to 5 μm, 0.1 to 1.5 μm, 0.1 to 1.0 μm, 0.1 to 0.5 μm, or 0.1 to 0.3 μm. The average thickness of the second portion may be the same as the average thickness of the first portion.

According to a yet further embodiment of the present disclosure, the crystalline binder and the amorphous binder may each independently include an aqueous emulsion type binder.

For example, the crystalline binder may be a polyvinylidenefluoride-based binder and the amorphous binder may be an acrylate-based binder.

Specifically, the crystalline binder may be one or more kinds selected from the group consisting of polyvinylidene fluoride, polyhexafluoropropylene, polytetrafluoroethylene, polyvinylidene fluoride-hexafluoropropylene (PVDF-HFP), polyvinylidene fluoride-trichloroethylene (PVDF-TCE), and polyvinylidene fluoride-chlorotrifluoroethylene (PVDF-CTFE). More particularly, the crystalline binder may be a copolymer comprising polyvinylidene fluoride.

According to a yet further embodiment of the present disclosure, the crystalline binder may have an average particle size $D_{50}$ in the range of from 200 nm or more and preferably the range of from 200 nm to 350 nm.

According to a yet further embodiment of the present disclosure, the weight average molecular weight ($M_w$) of the crystalline binder may be in the range of from 10,000 to 10,000,000 g/mol. The density of the crystalline binder may be in the range of from 1.1 to 1.5 g/cm$^3$.

According to a yet further embodiment of the present disclosure, the crystalline binder may have a glass transition temperature in the range of from 80° C. to 200° C., the range of from 80° C. to 150° C., the range of from 110° C. to 145° C., and the range of from 80° C. to 150° C. The crystalline binder may exhibit high oxidation resistance to the electrolyte.

According to a yet further embodiment of the present disclosure, the amorphous binder may include an acrylate-based polymer and specifically may be a copolymer including acrylate as a monomer.

As needed, the amorphous binder may further include one or more binder materials selected from the group consisting of styrene-butadiene rubber, nitril-butadiene rubber, acrylonitrile-butadiene rubber, and acrylonitrile-butadiene-styrene rubber.

The amorphous binder may have an average particle size $D_{50}$ of 350 nm or greater. Preferably, the average particle size $D_{50}$ may be in the range of from 350 nm to 500 nm and more preferably the range of from 350 nm to 450 nm. When the average particle size of the amorphous binder exceeds 500 nm, the mobility toward the interface between the electrode and the coating layer is reduced when an electrolyte is not present, and the adhesion between the electrode and the separator is reduced so that it is difficult to make an electrode assembly. Moreover, when forming the coating layer, it is difficult to obtain the uniform coating quality. Moreover, since the number of binder particles is reduced for the same binder content, the number of contact points between the adjacent inorganic particles is reduced. For this reason, the likelihood of detachment of the inorganic material increases, the interstitial volume decreases, and the electrical resistance decreases.

The amorphous binder has a larger average particle size $D_{50}$ than the crystalline binder. The amorphous binder has a larger contact area with the electrode than the crystalline binder, thereby providing better dry adhesion.

The weight average molecular weight of the amorphous binder may be in the range of from 10,000 to 10,000,000 g/mol. The density of the amorphous binder may be in the range of from 0.5 to 1.1 g/cm$^3$.

The amorphous binder may have a glass transition temperature in the range of 40° C. or higher, preferably the range of from 45° C. to 60° C., and more preferably the range of from 48° C. to 60° C. Conventionally, acrylic binder particles having a relatively small particle size of 100 to 150 nm were used. Generally, the acrylic-based binder particles include a diene-based butadiene rubber and have a low glass transition temperature. Due to the low glass transition temperature and the presence of double bonds, the acrylic-based binder particles react with an electrolyte, thereby generating gas. Therefore, the amorphous binder may use a copolymer generated by co-polymerization of acryl and styrene and having an increased glass transition temperature rather than using an acrylic binder having a glass transition temperature lower than 0° C., thereby preventing a side reaction with an electrolyte. In addition, when the glass transition temperature is in the range described above, the amorphous binder maintains its shape even during the primary drying of the coating layer and exhibits dry adhesion with the electrode.

In one specific example, the crystalline binder may have a similar characteristic to a binder used for a cathode, and the amorphous binder may have a similar characteristic to a binder used for an anode.

Specifically, the cathode may use a polyvinylidenefluoride-based homopolymer having a crystallinity of 95% or higher, and for example, Homo PVDF being usable as a crystalline binder may be included a cathode mixture. The anode may use an amorphous acrylic binder of an aqueous emulsion type, and the amorphous acrylic binder may be included in an anode mixture.

As described above, since a binder having similar characteristics to binders used for an anode and a cathode is used for a separator coating layer, the adhesion between the anode and the separator and between the cathode and the separator can be improved. For example, the same binder may be used for the coating layer and the anode and cathode corresponding to the coating layer. Alternatively, the crystalline binder may have the same polymer backbone as the binder used for the cathode, and the amorphous binder may have the same polymer backbone as the binder used for the anode. For example, the binder that can be used for the anode or the cathode may be a homopolymer of PVdF, and the binder used for the separator may be a PVdF-HFP binder having an HFP substitution rate of 10%.

According to a yet further embodiment of the present disclosure, the weight ratio of the crystalline binder and the amorphous binder may be in the range of from 1:9 to 9:1, and more particularly from the range of from 3:7 to 7:3. When the weight ratio of the crystalline binder and the amorphous binder falls within the numerical range described above, with respect to the total weight of the crystalline binder and the amorphous binder, both of the dry adhesion that is an adhesion force when an electrolyte is not present and the wet adhesion that is an adhesion force when an electrolyte is present are good.

According to a yet further embodiment of the present disclosure, the wet adhesion of the separator to the electrode may be in the range of 10 to 15 gf/20 nm. For example, the wet adhesion of the separator to the electrode may be measured by: cutting each of the electrode and the separator into fractions with a predetermined size, placing each fraction in a pouch, and injecting an electrolyte into the pouch; pressing the electrolyte-containing pouch to prepare a specimen for measuring the wet adhesion; and performing a 90° peel test using Instron's UTM equipment at a speed of 200 nm/min to measure the adhesion of the separator to the electrode.

The separator prepared by the method described above is placed between an anode containing an Si-based anode active material and a cathode, heat and/or pressure is applied to the stacked structure so that the electrodes and the separator are bonded. This process is called a lamination process by which an electrode assembly is formed. In one embodiment of the present disclosure, the lamination process can be performed using a roll pressing device including a pair of pressing rollers. That is, the anode, the separator, and the cathode are sequentially stacked, and the stacked structure is inserted between the pressing rollers to achieve interlayer bonding. In this case, the lamination process may be performed by hot pressing.

In the present disclosure, the anode may include an anode current collector and an anode active material layer on at least one surface of the anode current collector. The anode active material layer includes a Si-based anode active material, a binder resin, and optionally a conductive material. As the anode active material, the Si-based anode active material may be used alone or may be used in combination with a carbon-based anode active material such as graphite.

The cathode includes a cathode current collector and a cathode active material layer provided on at least one surface of the cathode current collector. The cathode active material layer includes a cathode active material, a conductive material, and a binder resin. The cathode active material may be one type of material or a mixture of two or more types of materials selected from: layered compounds such as lithium manganese composite oxides ($LiMn_2O_4$, $LiMnO_2$, etc.), a lithium cobalt oxide ($LiCoO_2$), a lithium nickel oxide ($LiNiO_2$), or a compound substituted with one or more transition metals; lithium manganese oxides represented by a chemical formula of $Li_{1+x}Mn_{2-x}O_4$ (wherein x is 0 to 0.33) such as $LiMnO_3$, $LiMn_2O_3$, $LiMnO_2$, etc.; lithium copper oxides such as $Li_2CuO_2$; vanadium oxides such as $LiV_3O_8$, $LiV_3O_4$, $V_2O_5$, $Cu_2V_2O_7$, etc.; Ni-site lithium nickel oxides represented by a chemical formula of $LiNi_{1-x}M_xO_2$ (wherein M=Co, Mn, Al, Cu, Fe, Mg, B or Ga, and x=0.01 to 0.3); lithium manganese composite oxides represented by a chemical formula of $LiMn_1-xM_xO_2$ (wherein M=Co, Ni, Fe, Cr, Zn or Ta, and x=0.01 to 0.1) or of $Li_2Mn_3MO_8$ (wherein M=Fe, Co, Ni, Cu or Zn); $LiMn_2O_4$ in which Li ions are partially substituted with alkali earth metal ions; and disulfide compounds; and $Fe_2(MoO_4)_3$.

In one specific embodiment of the present disclosure, the conductive material may be one type or a mixture of two or more types selected from the group consisting of graphite, carbon black, carbon or metal fiber, metal powders, conductive whiskers, conductive metal oxides, activated carbon, and polyphenylene derivatives. More specifically, the conductive material may be one type or a mixture of two or more types selected from the group consisting of natural graphite, synthetic graphite, super-p, acetylene black, ketjen black, channel black, furnace black, lamp black, summer black, denka black, aluminum powder, nickel powder, zinc oxide, potassium titanium, and titanium oxide.

As the binder resin, a polymer commonly used for electrodes in the art may be used. Non-limiting examples of such binder resins include, but are not limited to, polyvinylidene fluoride-co-hexafluoropropylene, polyvinylidene fluoride-cotrichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose, and the like.

As described above, the prepared electrode assembly is loaded into an appropriate case, and an electrolyte is injected into the case to produce a battery cell.

In the present disclosure, the electrolyte is a salt having the structure "$A^+B^-$" wherein $A^+$ comprises an alkali metal cation such as $Li^+$, $Na^+$, $K^+$, or a combination thereof, and $B^-$ comprises an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. The salt may be dissolved or dissociated in an organic solvent composed of one type or a mixture of two or more types selected from propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone(NMP), ethylmethylcarbonate (EMC), and gamma butyrolactone (γ-butyrolactone), but is not limited thereto.

In addition, the present disclosure provides a battery module including a battery including the electrode assembly as a unit cell, a battery pack including the battery module, and a device including the battery pack as a power source. Specific examples of the device include: power tools driven by a battery-powered motor; electric vehicles including an electric vehicle (EV), a hybrid electric vehicle (HEV), and a plug-in hybrid electric vehicle (PHEV); and electric two-wheeled vehicles including an electric bike (E-bike), an electric scooter (E-scooter), an electric golf cart, a power storage system, etc., but the examples are not limited thereto.

Hereinafter, the present disclosure will be described in detail with reference to examples. The examples of the present disclosure described below may be modified into various forms, so that the scope of the present disclosure should not be construed as being limited to the examples described below. The examples are provided to enable those skilled in the art to more easily understand the present disclosure.

Example 1

Preparation of Separator
Step of Preparing a Separator:

Polyethylene (weight average molecular weight of 900,000 g/mol) and polypropylene (weight average molecular weight of 350,000 g/mol) were mixed in a weight ratio of 93:7 to serve as a core portion. Polyethylene resin (weight average molecular weight of 900,000 g/mol) was coextruded to form a skin portion on both surfaces of the core portion. While setting the elongation temperature to 105° C. and the thermal fixing temperature to 130° C., and a polyolefin separator substrate (total thickness: about 9 μm, core portion thickness: 7 μm, and total thickness of both skin portions: 2 μm) was prepared using a wet method.

Step of Preparing a Composition for Forming an Organic/Inorganic Composite Coating Layer:

An alumina product (Sumitomo, AES11) having an average particle size ($D_{50}$) of 500 nm, a density of 4 g/cm³, an aspect ratio of 1.3, and a BET specific surface area of 8 m²/g was used for inorganic particles. A fluorine-based water dispersion emulsion (Arkema, Aquatec9530, 30% by weight of solids) having an average particle size ($D_{50}$) of 200 nm was used as a crystalline polymer. An acrylic water dispersion emulsion (LGC, SA22, 30% by weight of solids) having an average particle size ($D_{50}$) of 350 nm and a density of 1 g/cm³ was used as an amorphous polymer. Carboxylmethylcellulose (Gl Chem, SG-L02) was used as a dispersant. These components were mixed in a weight ratio of 79:18:2:1 (inorganic particle:crystalline polymer:amorphous polymer; dispersant), and the mixture was added to a solvent (water) to prepare an organic/inorganic composite coating layer composition with a solid content of 30% by weight (viscosity at 20° C.=50 cP).

Step of Forming an Organic/Inorganic Coating Layer on Each Side of a Separator Substrate:

The organic/inorganic composite coating layer composition was applied on both surfaces of the polyolefin separator substrate using a bar coater. The polyolefin separator substrate on both surfaces of which the organic/inorganic composite coating layer composition was applied was moved at a speed of 40 m/min, introduced into seven heating zones having temperatures of 65° C., 65° C., 60° C., 55° C., 50° C., 45° C., and 45° C., respectively, and dried for 2 to 3 minutes to form organic/inorganic composite coating layers (each layer having a thickness of 3 µm). Thus, a separator was obtained.
Preparation of Cathode A cathode active material ($LiNi_{0.8}Mn_{0.1}Co_{0.1}O_2$), a conductive material (carbon black), a dispersant, and a binder resin (mixture of PVDF-HFP and PVDF) were mixed with water in a weight ratio of 97.5:0.7:0.14:1.66 to prepare a cathode active material slurry in which the concentration of components other than water was 50% by weight. Next, the slurry was applied to a surface of an aluminum thin film (10 µm thick) and dried to produce a cathode having a cathode active material layer (120 µm thick).
Preparation of Anode A Si-based anode active material (SiO 20%, graphite 80%), a conductive material (carbon black), a dispersant, and a binder resin (mixture of PVDF-HFP and PVDF) were mixed with water in a weight ratio of 97.5:0.7:0.14:1.66 to prepare an anode active material slurry in which the concentration of components other than water was 50% by weight. Next, the slurry was applied to a surface of a copper thin film (10 µm thick) and dried to produce an anode having an anode active material layer (120 µm thick).
Lamination Process Electrode assemblies were obtained by interposing one of the separators of the examples and the comparative examples between the cathode and the anode and by performing a lamination process. The lamination process was carried out using a hot press for 10 seconds under conditions of 70° C. and 5.2 MPa.
Electrolyte Injection Process Each of the electrode assemblies was injected with an electrolyte having a composition of $LiPF_6$ 1.0 M, EC/EMC=3/7, VC=2.0 to produce cells.

Example 2

Cells were manufactured in the same manner as in Example 1 except that the elongation temperature was adjusted to 120° C. and the thermal fixing temperature was adjusted to 115° C. when manufacturing separators.

Example 3

Cells were manufactured in the same manner as in Example 1 except that the thermal fixing temperature was adjusted to 115° C. when manufacturing separators.

Comparative Example 1

Cells were manufactured in the same manner as in Example 1 except that a mixture of polyethylene (average molecular weight of 900,000 g/mol) and polypropylene (average molecular weight of 350,000 g/mol) in a weight ratio of 97:3 was used as a resin to form the skin portion to prepare the separator, and the elongation temperature was adjusted to 120° C.

Comparative Example 2

Cells were manufactured in the same manner as in Example 1 except that a mixture of polyethylene (average molecular weight of 900,000 g/mol) and polypropylene (average molecular weight of 350,000 g/mol) in a weight ratio of 97:3 was used as a resin to form the skin portion to prepare the separators, and the thermal fixing temperature was adjusted to 115° C.

Comparative Example 3

Cells were manufactured in the same manner as in Example 1 except that a mixture of polyethylene (average molecular weight of 900,000 g/mol) and polypropylene (average molecular weight of 350,000 g/mol) in a weight ratio of 97:3 was used as a resin to form the skin portion to prepare the separators.

Comparative Example 4

Cells were manufactured in the same manner as in Example 1 except that a mixture of polyethylene (average molecular weight of 900,000 g/mol) and polypropylene (average molecular weight of 350,000 g/mol) in a weight ratio of 97:3 was used as a resin to form the skin portion to prepare the separators, the elongation temperature was adjusted to 120° C., and the thermal fixing temperature was adjusted to 115° C.

Experimental Example 1: Evaluation of Physical Properties of Separator Substrate For each polyolefin separator substrate manufactured, the PDI, the average pore size, the maximum pore size, strain (referred to as recovery strain) when a tensile stress of 15 MPa is applied at 60° C. for 60 seconds, and time (referred to as recovery time) that takes until reaching a recovery rate of 70% when a tensile stress of 2 MPa is applied at 70° C. for 180 seconds and then removed are shown in Table 1 below.

PDI=(weight average molecular weight)/(number average molecular weight)   [Equation 1:PDI measurement]

In this case, the values of the weight average molecular weight and the number average molecular weight were obtained through gel permeation chromatography (GPC) analysis for a separator cut to have a predetermined size.
[Measurement of Average Pore Size and Maximum Pore Size]

The average pore size and maximum pore size were measured by a pore size distribution using a capillary flow porometer (CFP) method.
[Measurement of Strain with Application of Tensile Stress of 15 MPa at 60° C. for 60 Seconds]

Strain was measured by applying a stress of 15 MPa at 60° C. for 60 seconds through dynamic mechanical analysis creep evaluation.
[Measurement of Time that Takes Until Reaching Recovery Rate of 70% when Tensile Stress of 2 MPa is Applied at 70° C. for 180 Seconds and then Removed]

Dynamic mechanical analysis was used to measure the time it took to reach a recovery rate of 70% after applying a stress of 2 MPa at 70° C. for 180 seconds.

TABLE 1

| Separator substrate | PDI | Average pore size (nm) | Maximum pore size (nm) | Strain (%) | Recovery time (sec) |
|---|---|---|---|---|---|
| Comparative Example 1 | 12.8 | 51.4 | 70.6 | 56.4 | 351 |
| Comparative Example 2 | 6.2 | 38.4 | 49.8 | 37.8 | 229 |
| Comparative Example 3 | 4.1 | 40.8 | 62.4 | 41.1 | 243 |
| Comparative Example 4 | 5.1 | 45.8 | 59.3 | 45.6 | 265 |

TABLE 1-continued

| Separator substrate | PDI | Average pore size (nm) | Maximum pore size (nm) | Strain (%) | Recovery time (sec) |
|---|---|---|---|---|---|
| Example 1 | 3.5 | 26.7 | 40.5 | 16.5 | 159 |
| Example 2 | 2.6 | 36.1 | 46.0 | 20.1 | 178 |
| Example 3 | 3.9 | 22.2 | 34.9 | 14.7 | 141 |

Experimental Example 2: Evaluation of Cell Characteristics

[Capacity Retention Rate]
For the manufactured cells, 200 cycles of 2 C/2 C charging and discharging were performed at 25° C. were performed, and 0.33 C charging and discharging were repeated three times to measure the cell capacity. Next, a change in cell capacity between pre-evaluation and post-evaluation was calculated.

[Hi-Pot Evaluation Pass Rate]
It was performed under the conditions of 50V and <0.5 mA (lamp up: 0 sec, time: 0.1 sec) for 10 manufactured cells, and it was confirmed whether the cells were defective or not.
The measurement results are shown in Table 2 below.

TABLE 2

| Classification | Hi-pot evaluation pass rate (number of passes/number of evaluated cells) | Capacity retention rate (%) |
|---|---|---|
| Comparative Example 1 | 2/10 | 51 |
| Comparative Example 2 | 3/10 | 58 |
| Comparative Example 3 | 3/10 | 54 |
| Comparative Example 4 | 2/10 | 52 |
| Example 1 | 10/10 | 86 |
| Example 2 | 9/10 | 84 |
| Example 3 | 10/10 | 87 |

Example 4: Preparation of Separator Including Organic/inorganic Composite Coating Layer Composed of Only Amorphous Polymer A separator was prepared in the same manner as Example 1, except that the weight ratio was changed from 79:18:2:1 (inorganic particles:crystalline polymer:amorphous polymer:dispersant) to 79:20:1 (inorganic particles:amorphous polymer:dispersant).

Experimental Example 3: Measurement of Wet Adhesion of Separator-Electrode Assembly Specimens According to Example 1 and 4

The cathode of Example 1 and the separators manufactured by the methods according to Examples 1 and 4 were cut to have a width of 20 mm, the fraction was placed in a pouch, and the pouch was injected with a carbonate-based electrolyte solution. Two separate separator-electrode assembly samples for measuring wet adhesion were prepared by pressing the pouch containing the electrolyte solution under conditions of 5 kgf, 70° C., and 4 minutes. To measure the adhesion of the separator to the cathode, a 90° peel test was performed using Instron's UTM instrument at a speed of 200 nm/min.

TABLE 3

| Classification | Example 1 | Example 4 |
|---|---|---|
| Binder in organic/inorganic composite coating layer | Crystalline binder and amorphous binder | Amorphous binder |
| Wet adhesion (gf/20 mm) | 10 | 3 |

Referring to Table 3, compared to Example 4, in the case of the separator-electrode assembly according to Example 1, since both a crystalline binder and an amorphous binder are included in the organic/inorganic composite coating layer, the adhesion of the separator to the electrode in the wet state in which the electrolyte is present is increased to a suitable level of 10 to 15 gf/20 mm.

The invention claimed is:

1. A lithium secondary battery comprising:
   an anode comprising a Si-based anode active material,
   a cathode,
   a separator interposed between the anode and the cathode, the separator comprising a separator substrate comprising a polyolefin resin having a polydispersity index (PDI) of 2.5 to 4.2, and
   an organic/inorganic composite coating layer on at least one surface of the separator substrate, the organic/inorganic composite coating layer comprising a crystalline binder and an amorphous binder,
   wherein the amorphous binder has an average particle size that is larger than an average particle size of the crystalline binder,
   wherein the separator substrate has a plurality of pores,
   wherein the plurality of pores have an average pore size of 20 to 40 nm and a maximum pore size of 50 nm or less, and
   wherein the separator substrate has:
   a strain of 25% or less when a tensile stress of 15 MPa is applied at 60° C. for 60 seconds and
   a recovery time of 200 seconds or less to reach a recovery rate of 70% when a tensile stress of 2 MPa is applied at 70° C. for 180 seconds and then removed.

2. The lithium secondary battery according to claim 1, wherein the polyolefin resin has a PDI of 2.5 to 4.0,
   the plurality of pores have an average pore size of 20 to 39 nm and a maximum pore size of 48 nm or less, and
   the separator substrate has:
   a strain of 23% or less when a tensile stress of 15 MPa is applied at 60° C. for 60 seconds, and
   a recovery time of 190 seconds or less to reach a recovery rate of 70% when a tensile stress of 2 MPa is applied at 70° C. for 180 seconds and then removed.

3. The lithium secondary battery according to claim 1, wherein the polyolefin resin has a PDI of 2.6 to 3.9,
   the plurality of pores have an average pore size of 21 to 38 nm and a maximum pore size of 46 nm or less, and
   the separator substrate has:
   a strain of 21% or less when a tensile stress of 15 MPa is applied at 60° C. for 60 seconds, and
   a recovery time of 180 seconds or less to reach a recovery rate of 70% when a tensile stress of 2 MPa is applied at 70° C. for 180 seconds and then removed.

4. The lithium secondary battery according to claim 3, wherein the plurality of pores have an average pore size of 22.2 to 36.1 nm, and
the separator substrate has:
a strain of 20.1% or less when a tensile stress of 15 MPa is applied at 60° C. for 60 seconds, and
a recovery time of 178 seconds or less to reach a recovery rate of 70% when a tensile stress of 2 MPa is applied at 70° C. for 180 seconds and then removed.

5. The lithium secondary battery according to claim 1, wherein the polyolefin resin has a weight average molecular weight of 500,000 to 1,500,000 g/mol.

6. The lithium secondary battery according to claim 1, wherein the separator substrate includes:
a core portion including a mixture of polyethylene and polypropylene, and
a polyethylene skin portion on each of both surfaces of the core portion.

7. The lithium secondary battery according to claim 1, further comprising an electrolyte,
wherein the crystalline binder and the amorphous binder each independently has a concentration gradient in a thickness direction of the organic/inorganic composite coating layer.

8. The lithium secondary battery according to claim 1, wherein the organic/inorganic composite coating layer includes:
a first portion adjacent to the separator substrate, and
a second portion opposite the first portion, and
a concentration of the crystalline binder in the second portion is higher than a concentration of the crystalline binder in the first portion.

9. The lithium secondary battery according to claim 1, wherein the Si-based anode active material includes at least one selected from the group consisting of Si, SiO, and Si alloys.

10. The lithium secondary battery according to claim 1, wherein the anode further comprises a graphite.

11. The lithium secondary battery according to claim 6, wherein the organic/inorganic composite coating layer has a porosity of 30% to 70% by volume.

12. The lithium secondary battery according to claim 6, wherein the crystalline binder includes a copolymer comprising polyvinylidene fluoride.

13. The lithium secondary battery according to claim 6, wherein the crystalline binder includes one or more selected from the group consisting of polyvinylidene fluoride, polyhexafluoropropylene, polytetrafluoroethylene, polyvinylidene fluoride-hexafluoropropylene (PVDF-HFP), polyvinylidene fluoride-trichloroethylene (PVDF-TCE), and polyvinylidene fluoride-chlorotrifluoroethylene (PVDF-CTFE).

14. The lithium secondary battery according to claim 12, wherein the amorphous binder includes a copolymer including acrylate as a monomer.

15. The lithium secondary battery according to claim 14, wherein the amorphous binder further includes one or more binder materials selected from the group consisting of styrene-butadiene rubber, nitrile-butadiene rubber, acrylonitrile-butadiene rubber, and acrylonitrile-butadiene-styrene rubber.

16. The lithium secondary battery according to claim 15, wherein the amorphous binder has a crystallinity of 30% or less, and
wherein the crystalline binder has a crystallinity of more than 30%.

17. The lithium secondary battery according to claim 16, wherein the crystalline binder has an average particle size in a range of from 200 nm to 350 nm, and
wherein the amorphous binder has an average particle size of from 350 nm to 500 nm.

18. The lithium secondary battery according to claim 6, wherein the organic/inorganic composite coating layer further comprises inorganic particles,
wherein the inorganic particles include alumina,
wherein the crystalline binder includes a polyvinylidene-fluoride-based polymer, and
wherein the amorphous binder includes an acrylate-based polymer.

19. The lithium secondary battery according to claim 18, wherein the organic/inorganic composite coating layer comprises a binder resin comprising the crystalline binder and the amorphous binder, and the inorganic particles in a ratio of 1:99 to 30:70 by weight.

20. The lithium secondary battery according to claim 1, wherein the separator has a wet adhesion to the anode, the cathode, or both, in a range of from 10 to 15 gf/20 mm.

* * * * *